US006917016B2

(12) United States Patent
Bäcker et al.

(10) Patent No.: US 6,917,016 B2
(45) Date of Patent: Jul. 12, 2005

(54) LIGHTWAVE OVEN WITH DRAWER

(75) Inventors: Martina Bäcker, Traunreut (DE); Wolfgang Fuchs, Altenmarkt A.D.ALZ (DE); Bernhard Herold, Regensburg (DE); Katrin Horn, Traunreut (DE); Kurt Lintner, Nussdorf (DE); Andreas Nitschke, Tacherting (DE); Martin Schulte, Hagen (DE); Martin Thaler, Oberteisendorf (DE)

(73) Assignee: BSH Bosch und Siemens Hausgerate GmbH, Munich (DE)

( * ) Notice: Subject to any disclaimer, the term of this patent is extended or adjusted under 35 U.S.C. 154(b) by 222 days.

(21) Appl. No.: 10/354,779

(22) Filed: Jan. 30, 2003

(65) Prior Publication Data

US 2003/0218408 A1 Nov. 27, 2003

(30) Foreign Application Priority Data

Jan. 30, 2002 (DE) ........................................ 102 03 606

(51) Int. Cl.$^7$ ............................ F24C 7/04; F24C 15/16; A21B 1/50; A21B 3/00

(52) U.S. Cl. ........................ 219/392; 219/385; 219/411

(58) Field of Search ................................ 219/385, 386, 219/391, 392, 395, 411; 126/190, 200, 332, 339, 337 A

(56) References Cited

U.S. PATENT DOCUMENTS

| | | | | | |
|---|---|---|---|---|---|
| 5,378,872 | A | * | 1/1995 | Jovanovic | 219/411 |
| 5,534,679 | A | | 7/1996 | Beaver, II et al. | |
| 5,674,421 | A | | 10/1997 | Beaver, II et al. | |
| 6,166,353 | A | * | 12/2000 | Senneville et al. | 219/385 |
| 6,175,099 | B1 | * | 1/2001 | Shei et al. | 219/385 |
| 6,525,298 | B1 | * | 2/2003 | Hunts | 219/385 |
| 2004/0020915 | A1 | * | 2/2004 | Shei | 219/385 |

FOREIGN PATENT DOCUMENTS

| | | |
|---|---|---|
| WO | WO 95/32396 | 11/1995 |

* cited by examiner

*Primary Examiner*—Joseph Pelham
(74) *Attorney, Agent, or Firm*—Laurence A. Greenberg; Werner H. Stemer; Ralph E. Locher

(57) ABSTRACT

A lightwave oven for heating food in a cooking chamber includes an oven housing, a drawer that can be moved out and in through an opening in the oven housing and has a bottom plate, side walls, and a rear wall that bound the cooking chamber, and a front plate to close the opening in the oven housing. A top plate is disposed above the drawer. The top plate can be moved relative to the drawer in the oven housing, rests on the drawer when in an operating position, and, as a result, bounds the cooking chamber of the drawer from above. Such a lightwave oven is configured to simplify and make easier the cleaning of the cooking chamber, and can be constructed cost-effectively and, furthermore, can be used flexibly.

25 Claims, 6 Drawing Sheets

LIGHTWAVE OVEN WITH DRAWER

BACKGROUND OF THE INVENTION

Field of the Invention

The invention relates to a lightwave oven for heating food in a cooking chamber having an oven housing and a drawer that can be moved out and in through an opening in the oven housing, a bottom plate, side walls, and a rear wall that bound the cooking chamber, and a front plate to close the opening in the oven housing.

Lightwave ovens are ovens that heat the food by visible and infrared radiation. As a result of the action of visible, virtually visible, and infrared radiation of high intensity on the food, a very rapid and high-quality cooking and baking method is provided. The cooking times lie approximately in the time frame that is known from the use of microwave ovens, browning being achieved as is known from conventional ovens.

The light/radiation sources used in the known lightwave ovens are tungsten quartz halogen lamps, such as quartz arc lamps.

A lightwave oven of the generic type is known, for example from International Application WO 95/32396 A1, corresponding to U.S. Pat. No. 5,674,421 to Beaver II et al. and U.S. Pat. No. 5,534,679 to Beaver II et al. In the case of this prior art oven, the food carrier includes a plate that is open at the front and provided with three side walls and has a central opening into which a metal grid can be inserted, which is used to actually hold the food. The grid can be rotated by rollers disposed underneath the plate so that the food can be moved relative to the light/radiation source. The door for closing the opening in the oven housing, from which the food carrier can be moved out, is constructed as a pivoting door that is opened or closed by the movable food carrier. The disadvantage with such a prior art configuration is, firstly, that, because of the design of the food carrier as a plate that is open at the front and provided with only three side walls and a central opening, the cleaning of the oven is possible only with difficulty and, secondly, the lightwave oven is constructed to irradiate the food only from above.

SUMMARY OF THE INVENTION

It is accordingly an object of the invention to provide a lightwave oven with drawer that overcomes the hereinafore-mentioned disadvantages of the heretofore-known devices of this general type and that makes easier and/or simplifies the cleaning of the cooking chamber.

With the foregoing and other objects in view, there is provided, in accordance with the invention, a lightwave oven, including an oven housing defining an opening, a drawer movably disposed in the oven housing, the drawer moving in and out through the opening and having a bottom plate, side walls, and a rear wall together with the bottom plate and the side walls at least partially bounding a cooking chamber for heating food, a front plate movably disposed with respect to the oven housing for closing the opening, and a top plate movably disposed in the oven housing above the drawer, the top plate having an operating position, moving relative to the drawer, and resting on the drawer when in the operating position and, as a result, bounding the cooking chamber of the drawer from above.

According to the invention, above the drawer that can be moved out and in through an opening in the oven housing, a top plate that can be moved relative to the latter is disposed in the oven housing that rests on the drawer when in an operating position and, as a result, bounds the cooking chamber of the drawer from above.

As a result of limiting the cooking chamber to the space within the drawer and the top plate, no vapors can emerge from this space into the further oven housing. In particular, no vapors emerge that can get outside the drawer, between the outer walls of the drawer and the inner walls of the oven housing and, for example, contaminate the guide rails located there for the inward and outward movement of the drawer. In the construction according to the invention, it is, therefore, superfluous to insulate or seal off these guide rails by special measures.

The drawer has a bottom area and four side walls. The top plate rests on the drawer in the operating position and, together with the drawer, bounds a closed cooking chamber. A seal can be provided between top plate and drawer to close the cooking chamber formed in a vaportight and reliable manner.

The vapors formed during a cooking operation can deposit only on the inner walls of the cooking chamber bounded by drawer and top plate and can only cause contamination there. Outside the cooking chamber, no contamination occurs. For the purpose of cleaning, therefore, only the inner walls of drawer and top plate have to be cleaned.

To make cleaning easier, the drawer and the top plate are, advantageously, configured to be removable. For such a purpose, an actuating device is provided to move the top plate and, before moving the drawer out of the interior of the oven housing, lifts the top plate, resting on the drawer in the operating position, off the drawer. The actuating device, preferably, moves the top plate away from the drawer by displacing it in the vertical direction upward. Another movement sequence is also possible, for example, folding the top plate out around a pivot at one of its outer edges, for example, by a hinge. The top plate can also be moved away from the drawer by displacement in the horizontal direction.

The drawer is easy to clean when it is moved out. Provision can also be made for the drawer to be separated entirely from the oven so that the drawer can be removed and can easily be cleaned at another suitable location. In a similar way, the top plate can also be configured to be removed from the oven housing to be able to clean the top plate in a simple way.

To ensure proper operation of the oven, the oven should be ready to operate only when drawer and top plate are in the oven. To achieve such a feature, a safety device can be provided, by which the operation of the lightwave oven is prevented when the top plate is removed. For such a purpose, a switch, pushbutton, or the like can be provided in the oven housing, which detects the presence of the top plate and, possibly, its proper position in the oven and closes an electrical contact, which supplies a signal and determines the operational readiness of the lightwave oven.

Alternatively or optionally, a safety device can be provided by which closure of the drawer is prevented when the top plate is removed. For such a purpose, a mechanical latching pawl can be provided, which permits the drawer to be closed only when the top plate has been inserted properly, by the latching pawl preventing the drawer moving in until the top plate has assumed its operating position.

The actuating device according to the invention can be constructed such that, after the drawer has been moved into the interior of the oven housing, the top plate is moved toward the drawer until the top plate is resting on the drawer in the operating position. The actuating device, preferably, moves the top plate vertically downward onto the drawer.

The top plate and/or the bottom of the drawer are constructed from a material that lets radiation through. Glass ceramic can, preferably, be used as the material that lets radiation through.

Additionally, to make it easier to clean the areas that let radiation through, both the top plate and the bottom of the drawer can be formed by a frame and a translucent screen inserted therein. In this case, the frame is mounted on the oven housing such that it can be moved out and in, in a manner analogous to the top plate. The screen can be of a material permitting radiation to pass therethrough.

In the preferred configuration, the frame or the top plate is coupled to the drawer such that the frame is lifted off the drawer as a result of the drawer being moved out. In addition, this coupling can be developed further such that the lifted frame is coupled to the drawer such that the action of moving the drawer out also moves the frame out.

The coupling of the frame or top plate and drawer can be carried out such that when the drawer is moved in, the aforementioned movements proceed in the opposite order, that is to say, as a result of the drawer being moved in, the frame or the top plate that was moved out is moved in and the frame or the top plate is, then, subsequently moved downward onto the drawer. When the top plate is resting on the drawer, the vaportight cooking chamber is formed again.

An additional measure can be to construct the rear wall of the drawer and match it to the opening in the oven housing such that the rear wall of the drawer closes the opening in the oven housing when in the moved-out position. As a result, the view into the oven housing is concealed so that, for example, unsightly mechanical or electrical components remain hidden, any light emitted by the lightwave heating device cannot emerge to the outside, and an optically pleasing wall edge is produced.

The actuating device can be configured in accordance with the technical capabilities of those skilled in the art. The actuating device can, preferably, be configured and actuated mechanically or electrically. In the mechanical design, the actuating device includes rollers, which are, preferably, rotatably mounted on the top plate and the rollers are guided in slotted guides that are fixed in the oven housing. In the electromotive design, an electric motor can be provided, which actuates the, preferably, mechanical actuating device. However, provision can also be made for the top plate to be moved electrically directly through a plurality of actuating motors.

With the objects of the invention in view, there is also provided a lightwave oven, including an oven housing defining an opening, a drawer movably disposed in the oven housing, the drawer moving in and out through the opening and having a bottom plate, side walls, a rear wall together with the bottom plate and the side walls at least partially bounding a cooking chamber for heating food, and a front plate connected to at least one of the bottom plate, the side walls, and the rear wall and movably disposed with respect to the oven housing for closing the opening, and a top plate movably disposed in the oven housing above the drawer, the top plate having an operating position, moving relative to the drawer, and resting on the drawer when in the operating position and, as a result, bounding the cooking chamber of the drawer from above.

Other features that are considered as characteristic for the invention are set forth in the appended claims.

Although the invention is illustrated and described herein as embodied in a lightwave oven with drawer, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
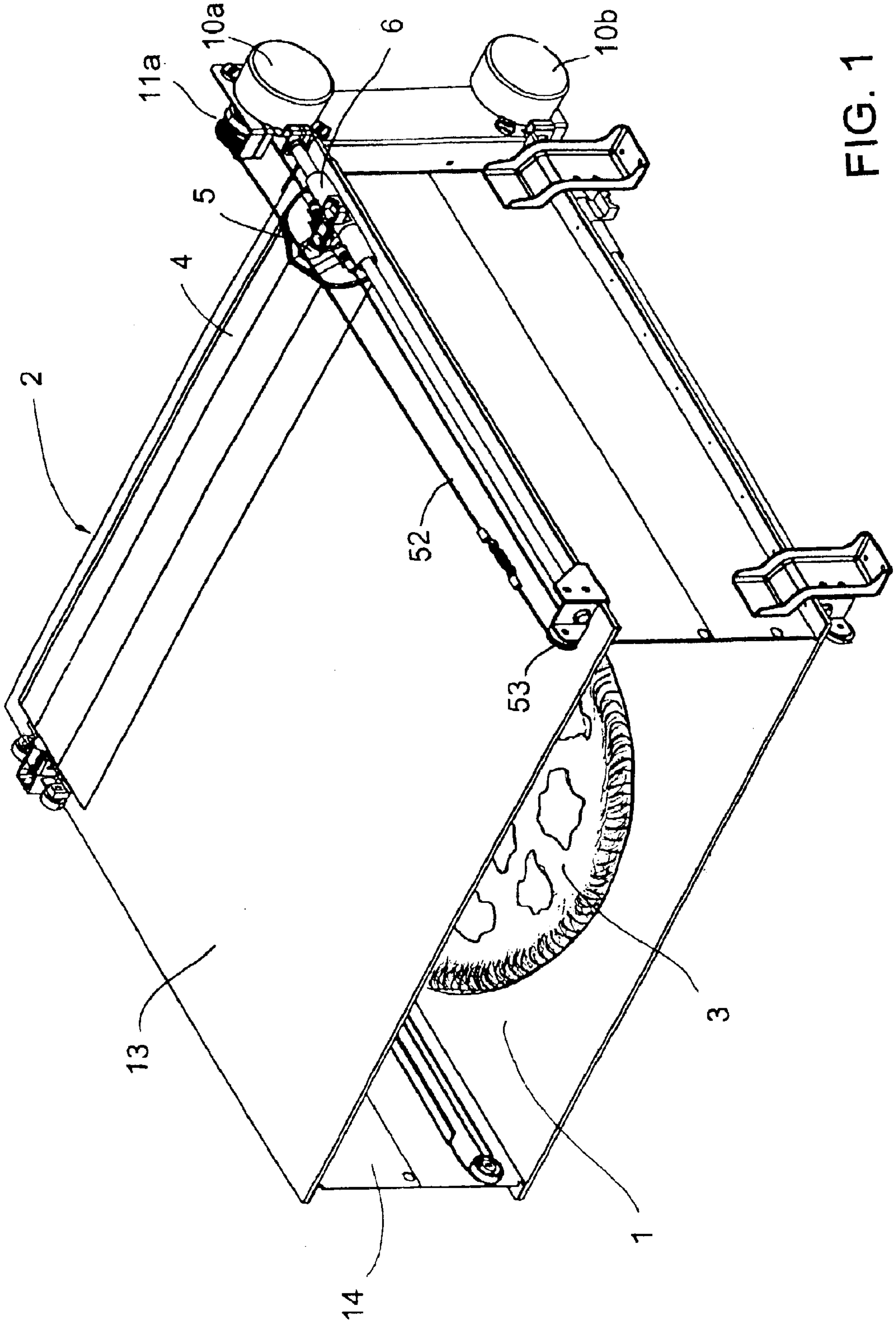
FIG. 1 is a perspective view of an oven housing of a lightwave oven according to the invention with a lightwave heating device that can be moved to and fro.

Referring now to the figures of the drawings in detail and first, particularly to FIG. 1 thereof, there is shown a preferred configuration of a lightwave oven having a lightwave heating device that can be moved to and fro. The cooking chamber 1 is enclosed by the oven housing 13 and, on its front side, has an opening 14 for the food 3 to be put into the cooking chamber 1. Above the cooking chamber 1 and underneath the cooking chamber 1, a lightwave heating device 2 that can be moved to and fro is disposed in each case (see FIG. 2). The lightwave heating device 2*a* disposed above the cooking chamber 1 includes an upper radiant lamp 5*a* and an upper lamp reflector 4*a*. The lightwave heating device 2*b* disposed underneath the cooking chamber 1 includes a lower radiant lamp 5*b* and a lower lamp reflector 4*b*. Each lightwave heating device 2*a*, 2*b* is fixed to its own movement device 6*a*, 6*b* such that it can be moved to and fro. The upper movement device 6*a* is driven through a pull cable 52 and a deflection roller 53 and an upper gear mechanism 11*a* by the stepping motor 10*a*. The lower movement device 6*b* is driven in the same way as the upper movement device 6*a* but independently of the latter by the lower stepping motor 10*b*.

Figure 2:
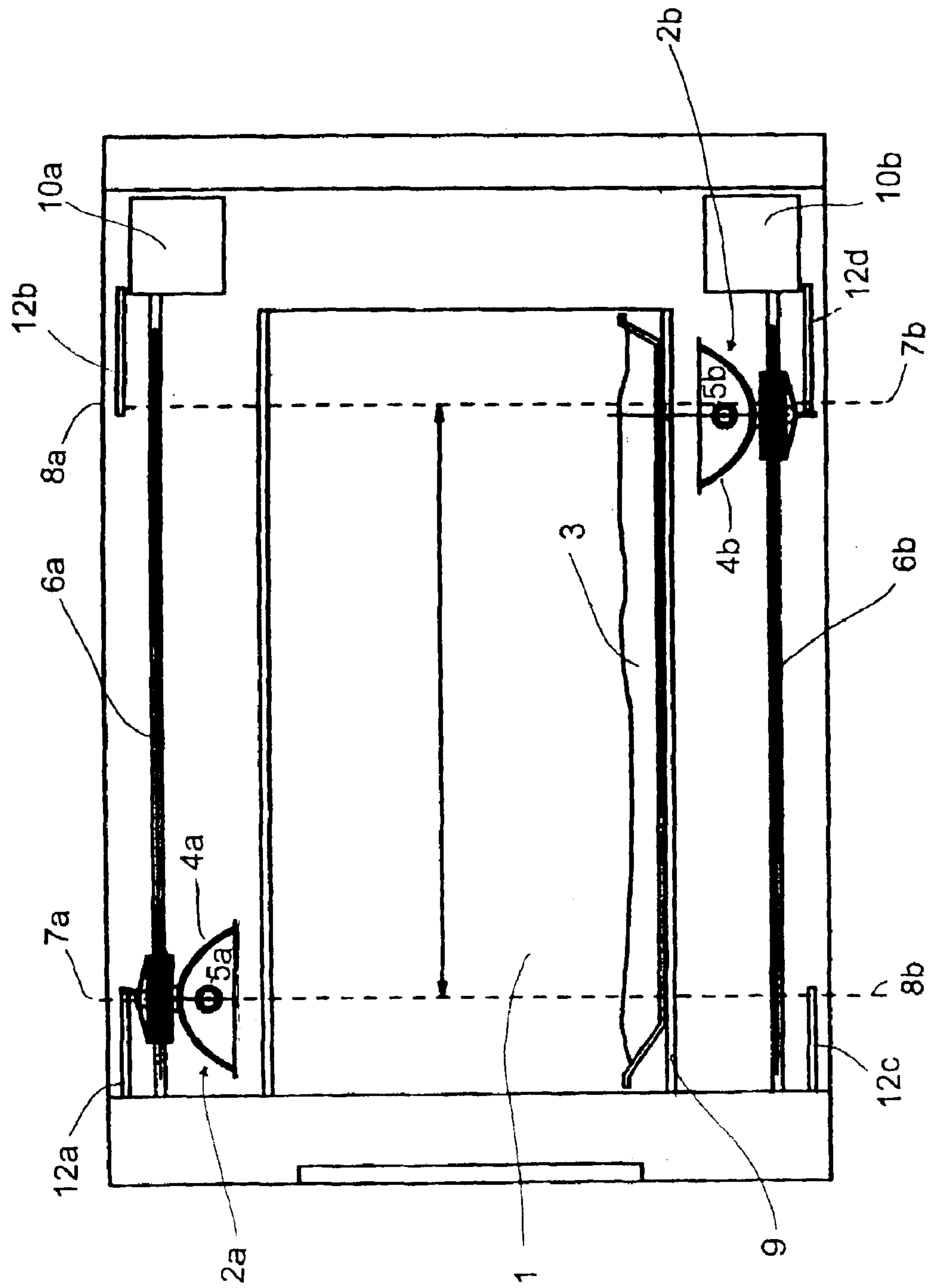
FIG. 2 is a diagrammatic cross-sectional view through the lightwave oven of FIG. 1.

The schematic cross-section through the lightwave oven, illustrated in FIG. 2, shows the cooking chamber 1 with food 3 placed on the food carrier 9. The upper lightwave heating device 2*a* includes the radiant lamp 5*a* and the lamp reflector 4*a*. The lower lightwave heating device 2*b* includes the radiant lamp 5*b* and the lamp reflector 4*b*. The upper lightwave heating device 2*a* can be moved to and fro on a travel path from a first position 7*a* into a second position 8*a* by the movement device 6*a*. The movement device 6*a* is driven by the stepping motor 10*a*. The lower lightwave heating device 2*b* can be moved to and fro on a travel path from a first position 7*b* into a second position 8*b* by the movement device 6*b*. The movement device 6*b* is driven by the stepping motor 10*b*. A limit switch 12*a* provides a signal to reverse the movement of the upper lightwave heating device 2*a* in the first position 7*a*. A limit switch 12*b* provides a signal to reverse the movement of the upper lightwave heating device 2*a* in the second position 8*a*. A limit switch 12*c* provides a signal to reverse the movement of the lower lightwave heating device 2*b* in the second position 8*b*. A limit switch 12*d* provides a signal to reverse the movement of the lower lightwave heating device 2*b* in the first position 7*b*.

Figure 3:
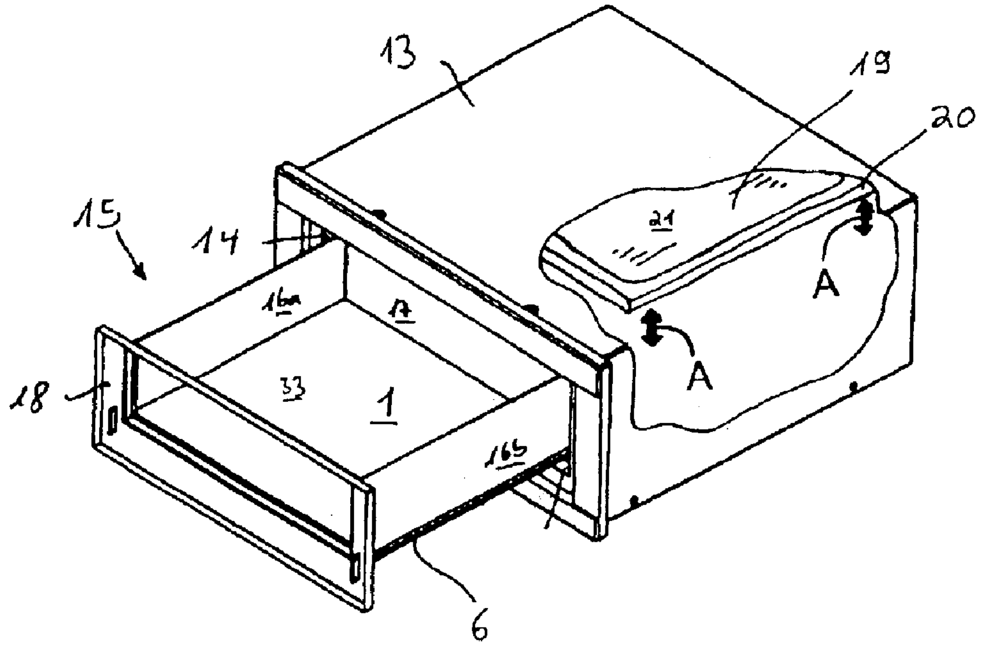
FIG. 3 is a diagrammatic perspective and partially cut-away view of a lightwave oven according to the invention with a drawer moved out.

FIG. 3 shows the perspective view of the lightwave oven with the drawer 15 moved out. The drawer 15 includes a bottom plate 33, a left-hand side wall 16*a*, a right-hand side wall 16*b*, a rear wall 17, and, also, a front plate 18 and, as a result, bounds the cooking chamber 1. In FIG. 3, the front plate 18 of the drawer 15 is transparent, that is to say, the front plate 18 includes a frame and a screen. The top plate 19, as can be seen from the partially cut-away view, is mounted in the interior of the oven housing 13. The top plate 19 includes a frame 20 into which a translucent screen 21 is let. The top plate 19 can move in the vertical direction, as indicated by the arrows A.

Figure 4:
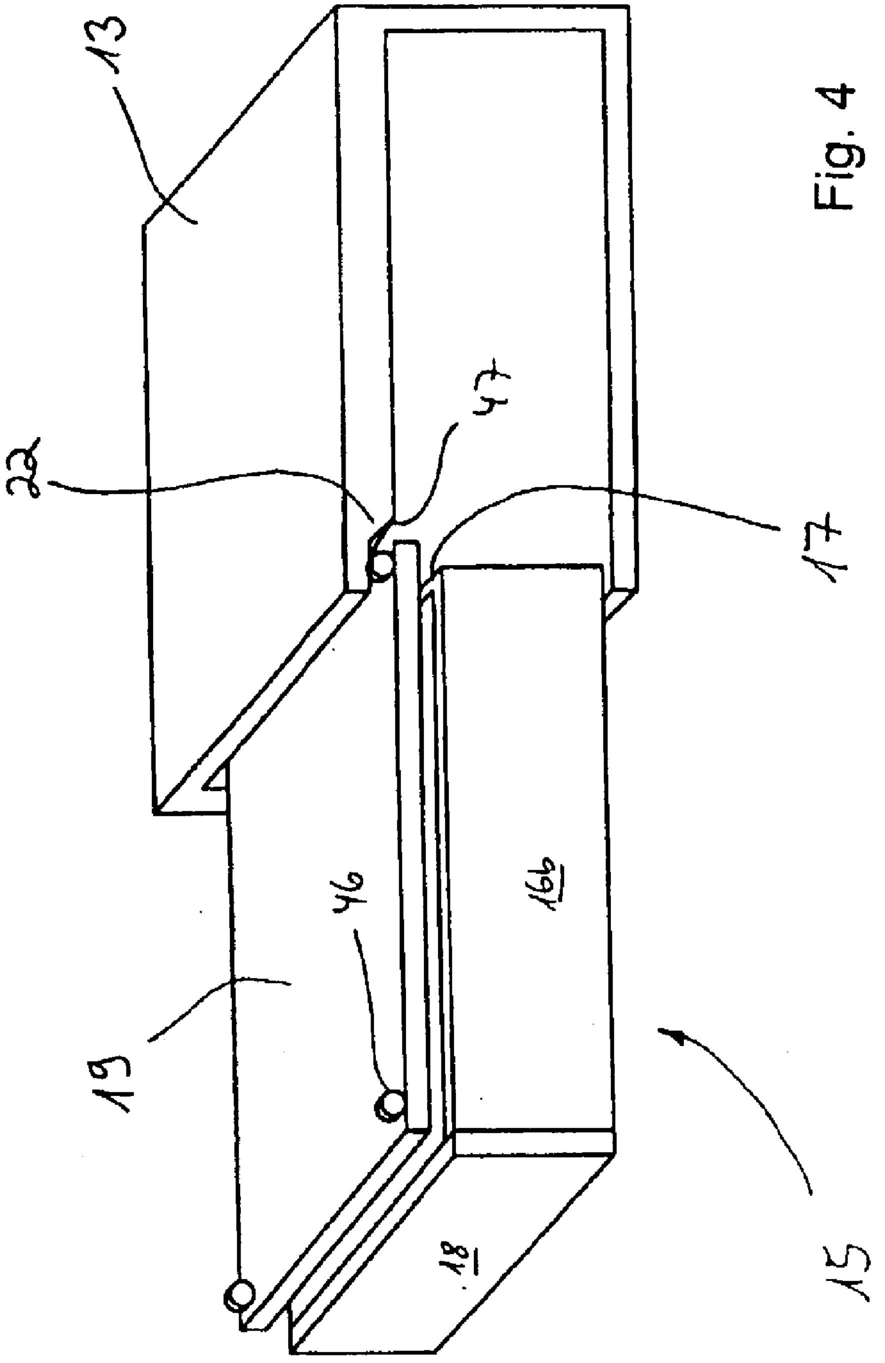
FIG. 4 is a diagrammatic, perspective view of the oven of FIG. 3 with the drawer moved out and a top plate moved out in the opened position.
Figure 5:
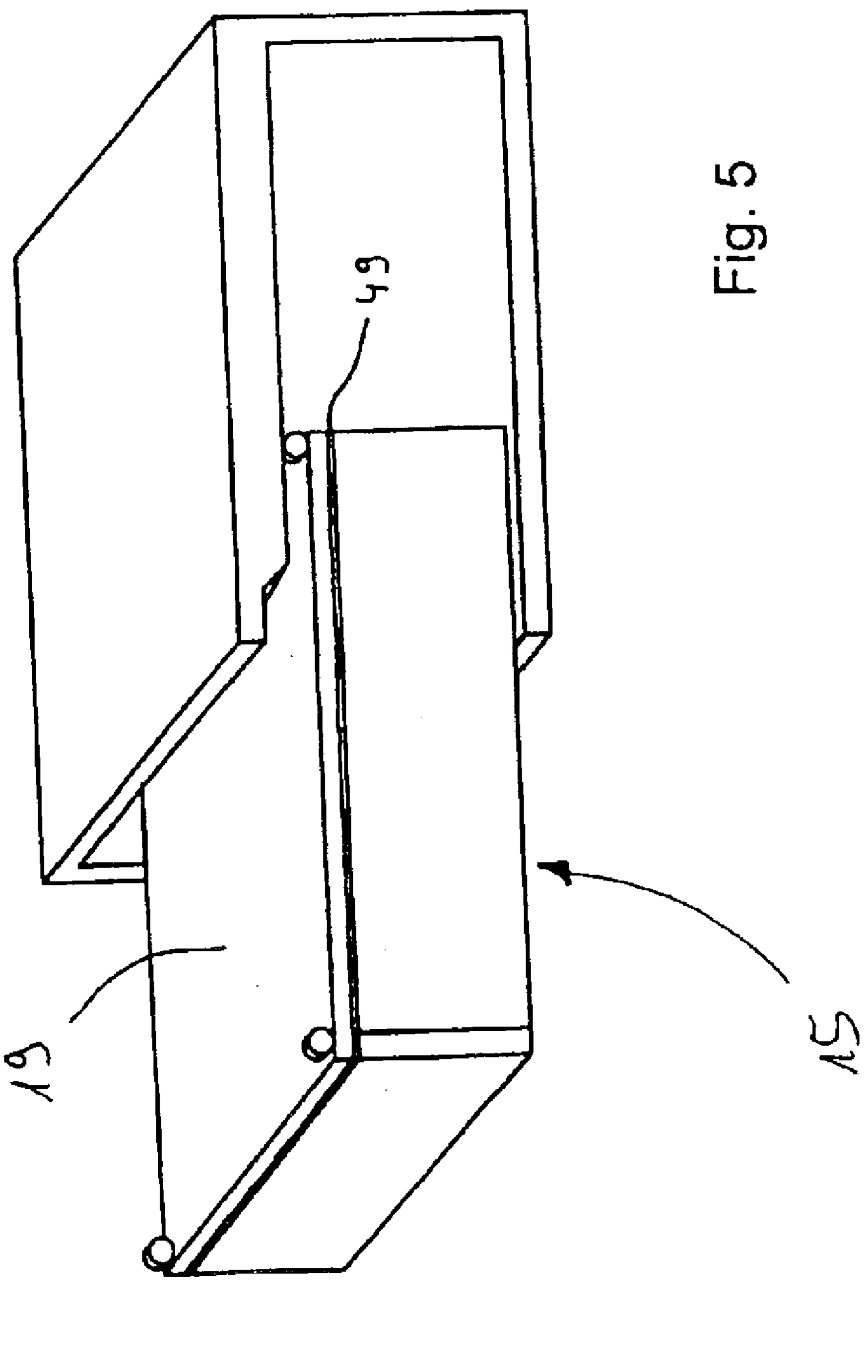
FIG. 5 is a diagrammatic, perspective view of the oven of FIG. 3 with the drawer partly moved out and the top plate in the closed position.

FIG. 4 shows a schematic illustration with the drawer 15 moved out and the top plate 19 moved out in the opened position. The actuating device 22 is formed by rollers 46, which are rotatably mounted on the top plate 19 and interact with a slotted guide 47 on the oven housing 13. Between the drawer 15 and the top plate 19, as illustrated in FIG. 5, there is disposed a seal 49. FIG. 5 shows the embodiment from FIG. 4 with the drawer 15 partly moved out and the top plate 19 in the closed position.

Figure 6:
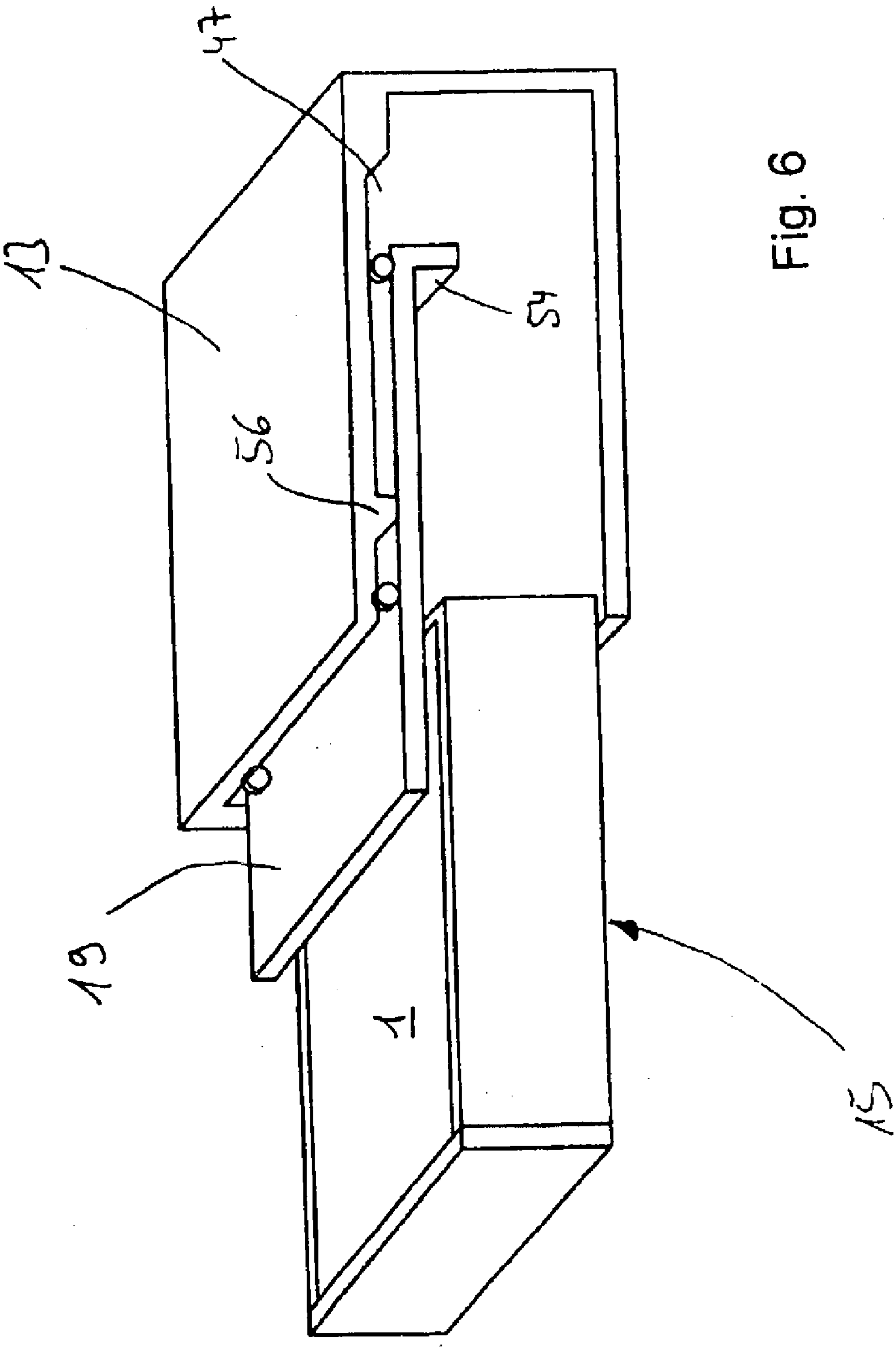
FIG. 6 is a diagrammatic, perspective view of the oven of FIG. 3 with the drawer moved out and the top plate partly moved out.

FIG. 6 shows a schematic illustration with the drawer 15 moved out and the top plate 19 partly moved out. The slotted guide 47 is configured to interact with a stop 54 at the rear end of the top plate 19 such that, as a result of the drawer 15 being moved in, the drawer 15 comes to rest on the stop 54 and pushes the top plate 19 into the interior of the oven housing 13 at the same time. As a result of the top plate 19 being pushed in, the top plate 19 is moved vertically downward onto the drawer 15 by the slotted guide 47, until the top plate 19 comes to lie on the top edges of the drawer 15 and closes the cooking chamber 1.

We claim:

1. A lightwave oven, comprising:

an oven housing defining an opening;

a drawer movably disposed in said oven housing, said drawer moving in and out through said opening and having:

a bottom plate;

side walls; and a rear wall together with said bottom plate and said side walls at least partially bounding a cooking chamber for heating food;

a front plate movably disposed with respect to said oven housing for closing said opening; and a top plate movably disposed in said oven housing above said drawer, said top plate:

having an operating position;

moving relative to said drawer; and resting on said drawer when in said operating position and, as a result, bounding said cooking chamber of said drawer from above.

2. The lightwave oven according to claim 1, including a seal disposed between said top plate and said drawer, said seal vaportightly closing said cooking chamber.

3. The lightwave oven according to claim 1, including a seal disposed between said top plate and said drawer, said seal vaportightly closing said cooking chamber formed by said top plate and said drawer.

4. The lightwave oven according to claim 2, including an actuating device disposed in said oven housing for moving said top plate, said oven housing having an interior, said actuating device, before said drawer is moved out of said interior, lifting said top plate resting on said drawer in said operating position off of said drawer.

5. The lightwave oven according to claim 3, wherein said actuating device moves said top plate away from said drawer by displacing said top plate upward in a vertical direction.

6. The lightwave oven according to claim 3, wherein said actuating device moves said top plate away from said bottom plate in a vertical direction.

7. The lightwave oven according to claim 4, wherein, after said drawer has been moved into said interior, said actuating device moves said top plate onto said drawer until said top plate is resting on said drawer in said operating position.

8. The lightwave oven according to claim 7, wherein said actuating device moves said top plate downward onto said drawer.

9. The lightwave oven according to claim 1, wherein said top plate is removably disposed in said oven housing.

10. The lightwave oven according to claim 1, including a safety device preventing closure of said drawer when said top plate is removed.

11. The lightwave oven according to claim 1, including a safety device preventing operation of the lightwave oven when said top plate is removed.

12. The lightwave oven according to claim 1, including:

a cooking element; and a safety device preventing operation of said cooking element when said top plate is removed.

13. The lightwave oven according to claim 1, wherein;

said top plate is a frame with a screen inserted therein; and said frame moves into and out from said oven housing.

14. The lightwave oven according to claim 13, wherein said frame is coupled to said drawer and lifts off from said drawer when said drawer is moved out from said oven housing.

15. The lightwave oven according to claim 14, wherein said lifted frame is coupled to said drawer and moves out said frame when said drawer is moved out from said oven housing.

16. The lightwave oven according to claim 13, wherein said frame is coupled to said drawer, when said drawer is moved into said oven housing, to at least one of:

move in said moved-out frame; and move said frame downward onto said drawer.

17. The lightwave oven according to claim 1, wherein said top plate is of a material permitting radiation to pass therethrough.

18. The lightwave oven according to claim 13, wherein said screen is of a material permitting radiation to pass therethrough.

19. The lightwave oven according to claim 1, wherein said bottom plate is of a material permitting radiation to pass therethrough.

20. The lightwave oven according to claim 1, wherein said rear wall closes said opening of said oven housing when said drawer is in a moved-out position.

21. The lightwave oven according to claim 4, including slotted guides fixed in said oven housing, said actuating device having rollers rotatably mounted on said top plate, said rollers being guided in said slotted guides.

22. The lightwave oven according to claim 4, wherein:

said oven housing has slotted guides;

said top plate has rollers rotatably mounted thereon; and said actuating device is said rollers guided in said slotted guides.

23. The lightwave oven according to claim 4, including an electric motor actuating said actuating device.

24. The lightwave oven according to claim 22, including an electric motor actuating said actuating device.

25. A lightwave oven, comprising:

an oven housing defining an opening;

a drawer movably disposed in said oven housing, said drawer moving in and out through said opening and having:

a bottom plate;

side walls;

a rear wall together with said bottom plate and said side walls at least partially bounding a cooking chamber for heating food; and a front plate connected to at least one of said bottom plate, said side walls, and said rear wall and movably disposed with respect to said oven housing for closing said opening; and a top plate movably disposed in said oven housing above said drawer, said top plate:

having an operating position;

moving relative to said drawer; and resting on said drawer when in said operating position and, as a result, bounding said cooking chamber of said drawer from above.

* * * * *